(12) United States Patent
Cheung et al.

(10) Patent No.: US 11,729,272 B2
(45) Date of Patent: Aug. 15, 2023

(54) HART-ENABLED DEVICE WITH REDUCED COMMUNICATION LINES AND BREAK EXTENSION PROTOCOL

(71) Applicant: TEXAS INSTRUMENTS INCORPORATED, Dallas, TX (US)

(72) Inventors: Hugo Cheung, Tucson, AZ (US); Michael Douglas Snedeker, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 98 days.

(21) Appl. No.: 17/032,703

(22) Filed: Sep. 25, 2020

(65) Prior Publication Data

US 2022/0103633 A1    Mar. 31, 2022

(51) Int. Cl.
| | | |
|---|---|---|
| H04L 67/12 | (2022.01) | |
| H04L 69/08 | (2022.01) | |
| G05B 19/042 | (2006.01) | |
| G05B 19/418 | (2006.01) | |
| H04L 25/02 | (2006.01) | |
| G06F 13/42 | (2006.01) | |

(52) U.S. Cl.
CPC .......... *H04L 67/12* (2013.01); *G05B 19/0425* (2013.01); *G05B 19/4186* (2013.01); *H04L 25/0264* (2013.01); *H04L 69/08* (2013.01); *G05B 2219/25428* (2013.01); *G06F 13/4213* (2013.01)

(58) Field of Classification Search
CPC ..... H04L 67/12; H04L 25/0264; H04L 69/08; G05B 19/0425; G05B 19/4186; G05B 2219/25428; G06F 13/4213
See application file for complete search history.

(56) References Cited

U.S. PATENT DOCUMENTS

| | | | | |
|---|---|---|---|---|
| 5,420,578 A | * | 5/1995 | O'Brien | G05B 15/02 340/870.39 |
| 6,473,710 B1 | * | 10/2002 | Eryurek | G08C 19/02 702/182 |
| 8,831,145 B2 | | 9/2014 | Shelburne | |
| 8,847,571 B2 | | 9/2014 | Kielb | |

(Continued)

OTHER PUBLICATIONS

International Search Report for PCT/US2021/052119 dated Dec. 2, 2021, 2 pgs.

*Primary Examiner* — Henry Tsai
*Assistant Examiner* — Aurangzeb Hassan
(74) *Attorney, Agent, or Firm* — John R. Pessetto; Frank D. Cimino

(57) ABSTRACT

A current loop includes a receiver assembly and a transmitter assembly. The current loop also includes: a first conductor between the receiver assembly and the transmitter assembly; and a second conductor between the receiver assembly and the transmitter assembly to complete the current loop. The transmitter assembly includes: a Highway Addressable Remote Transducer (HART) modem; a component in communication with the HART modem via a partial set of Universal Asynchronous Receiver-Transmitter (UART) communication lines; and a break extension protocol controller coupled to or included with the HART modem and configured to support UART and non-UART communications between the HART modem and the component using the partial set of UART communication lines.

26 Claims, 6 Drawing Sheets

(56) References Cited

U.S. PATENT DOCUMENTS

| | | | |
|---|---|---|---|
| 8,885,760 B2 | 11/2014 | Haase et al. | |
| 9,203,665 B1 | 12/2015 | Haren | |
| 10,303,134 B2* | 5/2019 | Junk | G05B 19/00 |
| 2004/0184517 A1* | 9/2004 | Westfield | G01D 11/245 |
| | | | 375/219 |
| 2009/0168857 A1* | 7/2009 | Golborne | H04L 27/1563 |
| | | | 375/303 |
| 2011/0286542 A1* | 11/2011 | Shelburne | H04L 27/12 |
| | | | 375/272 |
| 2012/0020430 A1* | 1/2012 | Haase | H03M 3/438 |
| | | | 375/295 |
| 2013/0107919 A1* | 5/2013 | Burns | H03K 9/06 |
| | | | 375/334 |
| 2014/0132072 A1* | 5/2014 | Hatori | G05F 1/561 |
| | | | 307/52 |
| 2015/0156286 A1* | 6/2015 | Blair | H04L 12/40006 |
| | | | 709/201 |
| 2017/0147367 A1* | 5/2017 | Alley | G05B 19/054 |
| 2017/0249278 A1* | 8/2017 | Hays | G06F 13/4226 |
| 2017/0366196 A1* | 12/2017 | Lovell | H03C 3/00 |
| 2018/0013857 A1* | 1/2018 | Pasala | H04L 67/28 |
| 2019/0103914 A1* | 4/2019 | Junk | H04W 12/10 |
| 2021/0311520 A1* | 10/2021 | Haase | G06F 1/10 |
| 2022/0038562 A1* | 2/2022 | Schäuble | G05B 19/4186 |

* cited by examiner ized. One example IC product that is needed is current loop devices with Highway Addressable Remote Transducer (HART) protocol compatibility. Such current loop devices are referred to herein as HART-enabled devices, where the HART protocol supports communications over legacy 4-20 mA analog instrumentation current loops by sharing the pair of wires in the current loop with the analog-only host systems. Other components used in conjunction with HART-enabled devices in a current loop include sensors, transducers, analog-to-digital converters (ADCs), digital-to-analog converters (DACs), microcontrollers (MCUs), and isolators.

HART-ENABLED DEVICE WITH REDUCED COMMUNICATION LINES AND BREAK EXTENSION PROTOCOL

BACKGROUND

The proliferation of electronic devices and integrated circuit (IC) technology has resulted in the commercialization of IC products. As new electronic devices are developed and IC technology advances, new IC products are commercialized. One example IC product that is needed is current loop devices with Highway Addressable Remote Transducer (HART) protocol compatibility. Such current loop devices are referred to herein as HART-enabled devices, where the HART protocol supports communications over legacy 4-20 mA analog instrumentation current loops by sharing the pair of wires in the current loop with the analog-only host systems. Other components used in conjunction with HART-enabled devices in a current loop include sensors, transducers, analog-to-digital converters (ADCs), digital-to-analog converters (DACs), microcontrollers (MCUs), and isolators.

One of the issues facing HART-enabled devices is that Universal Asynchronous Receiver-Transmitter (UART) and Serial Peripheral Interface (SPI) interfaces for an MCU host connection and/or data converters need to be accounted for. Two example HART-enabled devices that face this UART and SPI interface issue include a HART protocol smart transmitter device and HART protocol current input module. Conventional techniques for addressing the issue involve high cost isolation circuits and/or a high cost HART software stack. In one example, the MCU interface of a conventional HART-enabled device uses more than 10 signals to account for UART and SPI communications. Efforts to reduce complexity and cost of HART-enabled devices is ongoing.

SUMMARY

In accordance with at least one example of the disclosure, a current loop comprises a receiver assembly and a transmitter assembly. The current loop also comprises: a first conductor between the receiver assembly and the transmitter assembly; and a second conductor between the receiver assembly and the transmitter assembly to complete the current loop. The transmitter assembly includes: a Highway Addressable Remote Transducer (HART) modem; a component in communication with the HART modem via a partial set of Universal Asynchronous Receiver-Transmitter (UART) communication lines; and a break extension protocol controller coupled to or included with the HART modem and configured to support UART and non-UART communications between the HART modem and the component using the partial set of UART communication lines.

In accordance with at least one example of the disclosure, a HART-enabled device comprises a UART TXD communication line and a UART RXD communication line. The HART-enabled device also comprises a HART modem coupled to UART TXD and RXD communication lines, wherein the HART modem is configured to support UART and non-UART communications using the UART TXD and RXD communication lines.

In accordance with at least one example of the disclosure, a current loop transmitter module comprises: a microcontroller (MCU); and a converter configured to convert analog signals to digital signals or to convert digital signals to analog signals. The current loop transmitter module also comprises a HART modem coupled to the MCU and the converter via UART TXD and RXD communication lines. The current loop transmitter module also comprises a break extension protocol controller coupled to or included with the HART modem and configured to support UART and non-UART communications between the HART modem and the MCU and between using the HART modem and the converter using the UART TXD and RXD communication lines.

BRIEF DESCRIPTION OF THE DRAWINGS

For a detailed description of various examples, reference will now be made to the accompanying drawings in which.

DETAILED DESCRIPTION

Figure 1:
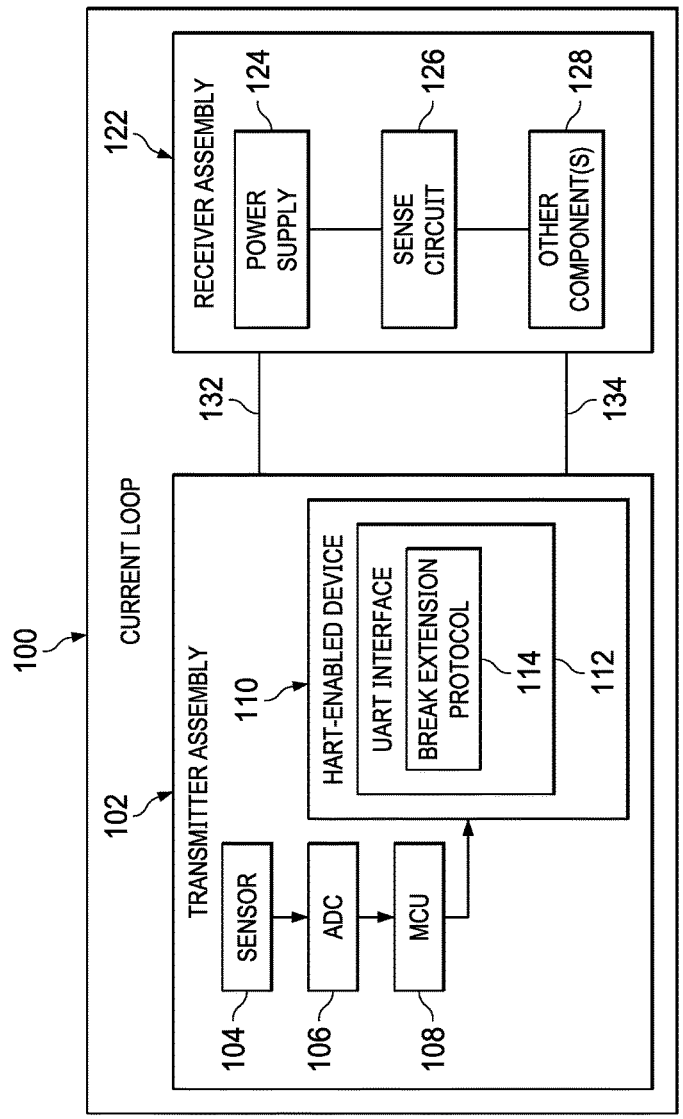
FIG. 1 is a block diagram showing a current loop in accordance with an example embodiment.

Disclosed herein is a Highway Addressable Remote Transducer (HART)-enabled device in a current loop transmitter assembly, where the HART-enabled device is configured to support Universal Asynchronous Receiver-Transmitter (UART) and Serial Peripheral Interface (SPI) communications using a reduced number of communication lines (e.g., a UART TXD communication line and a UART RXD communication line). To reduce the number of communication lines and still support conventional UART and SPI signaling, the HART-enabled device (e.g., a HART protocol smart transmitter device or HART protocol current input module) employs a break extension protocol. In some example embodiments, the HART-enabled device uses the break extension protocol and two UART communication lines (UART TXD and RXD communication lines) for UART and SPI communications with a microprocessor (MCU) and/or other components such as a digital-to-analog converter (DAC) and an analog-to-digital converter (ADC). More specifically, the break condition on the UART TXD line when sending data from the MCU to the HART-enabled device may indicate, for example, a control write command or control write data to a HART modem, a DAC, or an ADC. Also, the break condition on the RXD communication line when receiving data from the HART enabled device to the MCU may indicate, for example, control read data, status exceptions, or acknowledgement of a break write command. In some example embodiments, a break condition occurs when the UART TXD or RXD communication line is at the "space" (logic low) level for longer than or equal to a predetermined interval (e.g., 11-bits in a UART telegram). This break condition would be equivalent to a character of all zero bits with parity error and is functioned as an exception condition for a special control command and control data other than the HART telegram data.

In some example embodiments, the proposed HART-enabled device employs different options to reduce cost, complexity, and power consumption. For example, use UART communication lines enables the proposed HART-enabled device to keep the majority of the HART stack software unchanged, where the UART TXD and RXD communication lines are the minimum number of communication lines needed for communications between an MCU and the HART-enabled device. Other communication lines such as: ADC and DAC SPI lines (typically 4 lines); the HART modem to MCU interrupt request (IRQ) line; and the UART control signal lines (RTS/CTS/CD lines) are optional as the break command and the break exception could perform these same functionalities. In the proposed HART-enabled device, the break extension protocol achieves the enhanced features described herein (to support UART and SPI signaling with limited communication lines) without adding additional power consumption. As the interfacing UART bus carries the majority of the capacitive loading of the system, the power consumption of the proposed break extension protocol is dominated by the transition events of the UART bus. While the proposed HART-enabled device uses a higher UART baud rate, the total number of bus transitions remain almost the same per unit HART telegram transaction.

In some example embodiments, a proposed HART-enabled device achieves integrated converter (ADC or DAC) control, a compatible HART modem protocol control, and low power consumption. To provide a better understanding, various HART-enabled device options and related transmitter assembly or current loop scenario are described using the figures as follows.

FIG. 1 is a block diagram showing a current loop 100 in accordance with an example embodiment. In FIG. 1, the current loop 100 is formed using a transmitter assembly 102, a receiver assembly 122, a first wire 132 between the transmitter and receiver assemblies 102 and 122, and a second wire 134 between the transmitter and receiver assemblies 102 and 122. In the example of FIG. 1, the transmitter assembly 102 corresponds to integrated circuit (IC) components, or a combination of IC components and discrete components. If multiple ICs and/or discrete components are used, a printed circuit board (PCB) may be used to couple the multiple ICs and/or discrete components of the transmitter assembly 102 together. Also, the receiver assembly 122 corresponds to IC components, or a combination of IC components and discrete components. Again, if multiple ICs and/or discrete components are used, a PCB may be used to couple the multiple ICs and/or discrete components of the receiver assembly 122 together.

In the example of FIG. 1, the transmitter assembly 102 includes a sensor 104 coupled to an ADC 106 to provide digital sense data from the sensor 104. Examples of the sensor 104 include pressure sensors or temperature sensors. The output of the ADC 106 is coupled to an MCU 108, which is configured to process, store, and/or forward sense data to a HART-enabled device 110. Example of the HART-enabled device 110 include a smart transmitter device or current input module. In different examples, the HART-enabled device 110 includes a HART modem, an ADC, a DAC, and/or other components. Regardless of the particular components included with the HART-enabled device 110, a UART interface 112 is included to support communications with the MCU 108 and/or other components of the transmitter assembly 102. In the proposed example of FIG. 1, the UART interface 112 includes a break extension protocol controller 114 to support UART and SPI communications between the HART-enabled device 110 and other components of the transmitter assembly 102 using a limited set of communication lines. In some example embodiments, the HART-enabled device 110 only uses UART TXD and RXD communication lines to support UART and SPI communications with other components of the transmitter assembly 102. In other example embodiments, the HART-enabled device 110 uses one or more additional communication lines corresponding to SPI lines (typically 4 lines), a HART modem to MCU interrupt request (IRQ) line, and the UART control signal lines (RTS/CTS/CD lines).

With the break extension protocol controller 114, the HART-enabled device 110 is able to perform UART and SPI signaling with other components of the transmitter assembly 102 using a reduced number of communication lines compared to legacy HART-enabled devices. As shown, the receiver assembly 122 includes a power supply 124 to supply a voltage and current for the current loop 100. The receiver assembly 122 also includes sense circuit 126 configured to detect signaling from the transmitter assembly 102. The receiver assembly 122 also includes other component(s) 128 such as an ADC, a processor, and/or other components configured to demodulate, store, process, and/or respond to signaling from the transmitter assembly 102.

Figure 2:
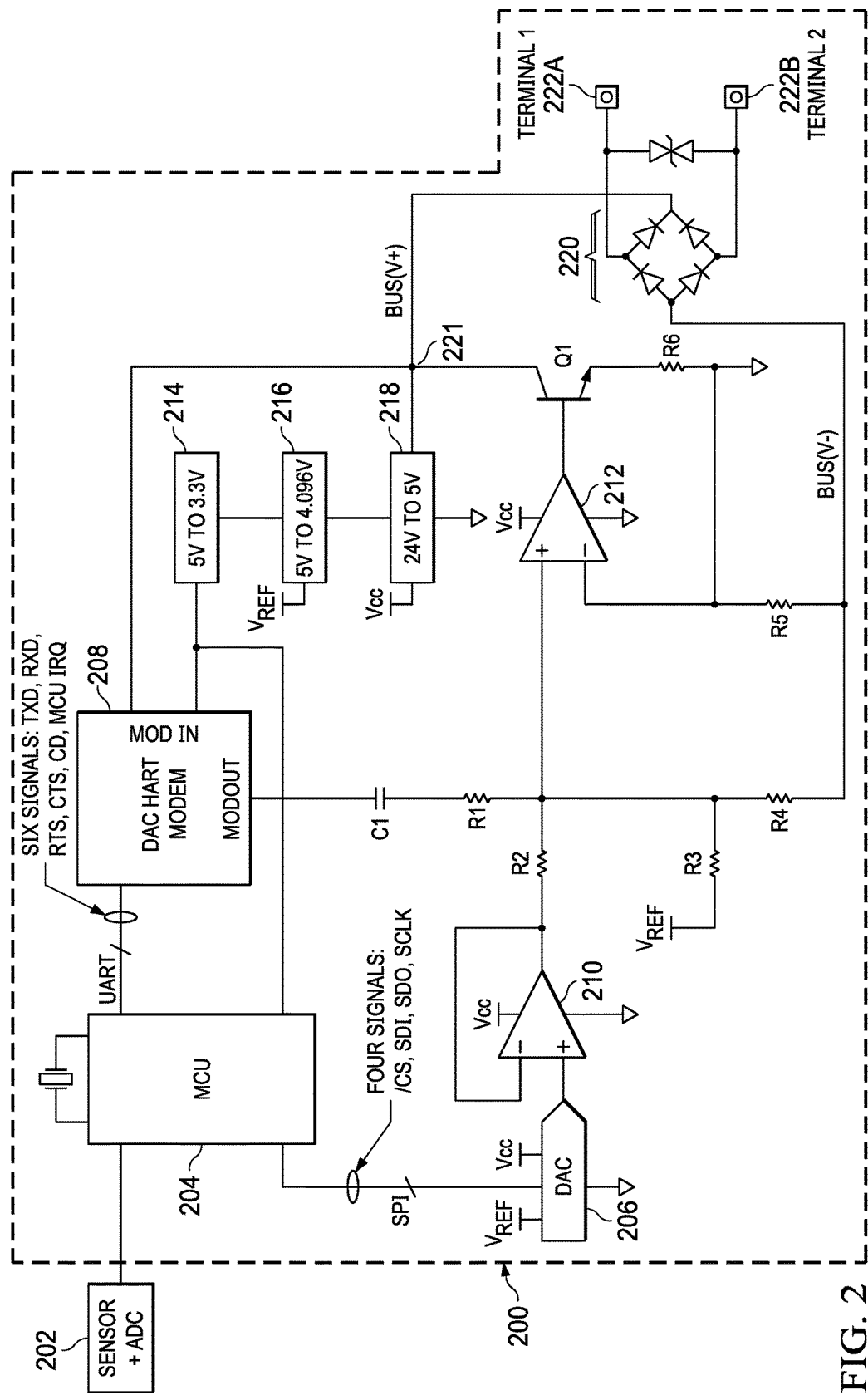
FIG. 2 is a schematic diagram showing a HART-enabled smart transmitter module in accordance with an example embodiment.

FIG. 2 is a schematic diagram showing a HART-enabled smart transmitter module 200 in accordance with an example embodiment. In the example of FIG. 2, the HART-enabled smart transmitter module 200 is part of a transmitter assembly (e.g., the transmitter assembly 102 in FIG. 1) of a current loop (e.g., the current loop 100 in FIG. 1). As shown, the HART-enabled smart transmitter module 200 includes a DAC HART modem 208. The HART-enabled smart transmitter module 200 also includes an MCU 204 coupled to the DAC HART modem 208 via a UART interface. As shown, the MCU 204 is also coupled to a DAC 206, where the MCU 204 and the DAC 206 communicate via an SPI interface. The MCU 204 is also coupled to a sensor and ADC block 202 represented as separate from the HART-enabled smart transmitter module 200, where the sensor and ADC block 202 is configured to provide digitized sensor data to the MCU 204. In operation, the MCU 204 stores and/or processes the digitized sensor data. As needed, the MCU 204 communicates with the DAC 206 and/or the DAC HART modem 208 via the SPI and UART interfaces. To modulate data for transmission by a current loop conductor coupled to the current loop terminal 222A or 222B, the DAC HART modem 208 provides data via a modulation output (MODOUT).

In the example of FIG. 2, the HART-enabled smart transmitter module 200 includes various components to perform modulation operations based on the data output from MODOUT. More specifically, modulation of data by the HART-enabled smart transmitter module 200 is a function of C1, R1-R6, operational amplifiers buffers 210 and 212, a switch (NPN transistor Q1), a full rectifier 220, and the DAC 206. In FIG. 2, the full rectifier 220 is part of the HART-enabled smart transmitter module 200. In other example embodiments, the full rectifier 220 is external to the HART-enabled smart transmitter module 200.

More specifically, modulation operations of the HART-enabled smart transmitter module 200 involve the operational amplifier buffer 212 summing the modulation of data on MODOUT with the signal provided to the operational amplifier buffer 210 from the DAC 206. Also, NPN transistor Q1 boosts the output signal of the operational amplifier buffer 212 to a BUS node 221. In the example of FIG. 2, the voltage (V+) supplied to the BUS node 221 is adjustable using different voltage regulator supply blocks 214, 216, and 218. The voltage regulation supply blocks 214, 216, and 218 also provide power to the MCU 204, the DAC HART modem 208, $V_{REF}$ voltage circuitry (not shown) to provide $V_{REF}$, where $V_{REF}$ is provided to the DAC 206 and the voltage regulator supply block 216. The voltage regulation supply blocks 214, 216, and 218 also provide power to $V_{cc}$ analog circuitry (not shown) to provide $V_{cc}$ for the voltage regulator supply block 218, the DAC 206, and the operational amplifier buffers 210 and 212.

In some example embodiments, a HART-enabled smart transmitter module such as the HART-enabled smart transmitter module 200 of FIG. 2 includes a HART-enabled device (e.g., the HART-enabled device 110) that combines components of the HART-enabled smart transmitter module 200. In some example embodiments, a HART-enabled device for the HART-enabled smart transmitter module 200 includes the DAC 206 and the DAC HART modem 208. In other example embodiments, the HART-enabled device for the HART-enabled smart transmitter module 200 includes all components of the HART-enabled smart transmitter module 200 except the MCU 204. Also, in some example embodiments, the full rectifier 220 is omitted from the HART-enabled device (e.g., the full is external to the HART-enable device and/or the HART-enabled smart transmitter module 200. Regardless of the particular combination of components, a HART-enabled device for the HART-enabled smart transmitter module 200 uses a break extension protocol and a reduced set of communication lines as described herein.

In one example embodiment, a HART-enabled device for the HART-enabled smart transmitter module 200 reduces the number of communication lines used (e.g., the SPI communication lines between the DAC 206 and the MCU 204 are no longer needed, and the UART communication lines between the DAC HART modem 208 and the MCU 204 are reduced). With a HART-enabled device for the HART-enabled smart transmitter module 200, the DAC HART modem 208 is able to communicate with: the MCU 204 using the break extension protocol and the reduced set of communication lines (e.g., UART TXD and RXD communication lines); the DAC 206 using the break extension protocol and the reduced set of communication lines (e.g., UART TXD and RXD communication lines); and/or any other component normally controlled through SPI/I2C or other protocols.

In some example embodiments, with a HART-enabled device for the HART-enabled smart transmitter module 200, the HART-enabled device is able to perform SPI and UART communications with components HART-enabled device and/or components of the HART-enabled smart transmitter module 200 using only two communication lines (e.g., a compact two-wire integrated interface with UART TXD and RXD communication lines) and the break extension protocol. In different examples, different SPI signaling options (e.g., /CS, SDI, SDO, SCLK) and UART signaling options (e.g., TXD, RXD, RTS, CTS, CD, MCU, IRQ) are performed using only the UART TXD and RXD communication lines and the break extension protocol. In other example embodiments, a HART-enabled device for the HART-enabled smart transmitter module 200 uses a reduced set of communication lines (compared to legacy HART-enabled devices) to support UART and SPI communications (e.g., the UART TXD and RXD communication lines and at least one additional communication line related to /CS, SDI, SDO, SCLK, RTS, CTS, CD, MCU, and/or IRQ signaling). By using the break extension protocol with the HART-enabled device and the reduced set of communication lines to support UART, SPI, and/or other communication protocols, the complexity of the HART-enabled smart transmitter module 200 is simplified, which reduces an IC footprint and related cost compared to a legacy HART-enabled smart transmitter module. Also, fewer isolators are needed (e.g., 2 instead of 10 isolators used by the DAC HART modem 208), which reduces cost and complexity.

Figure 3:
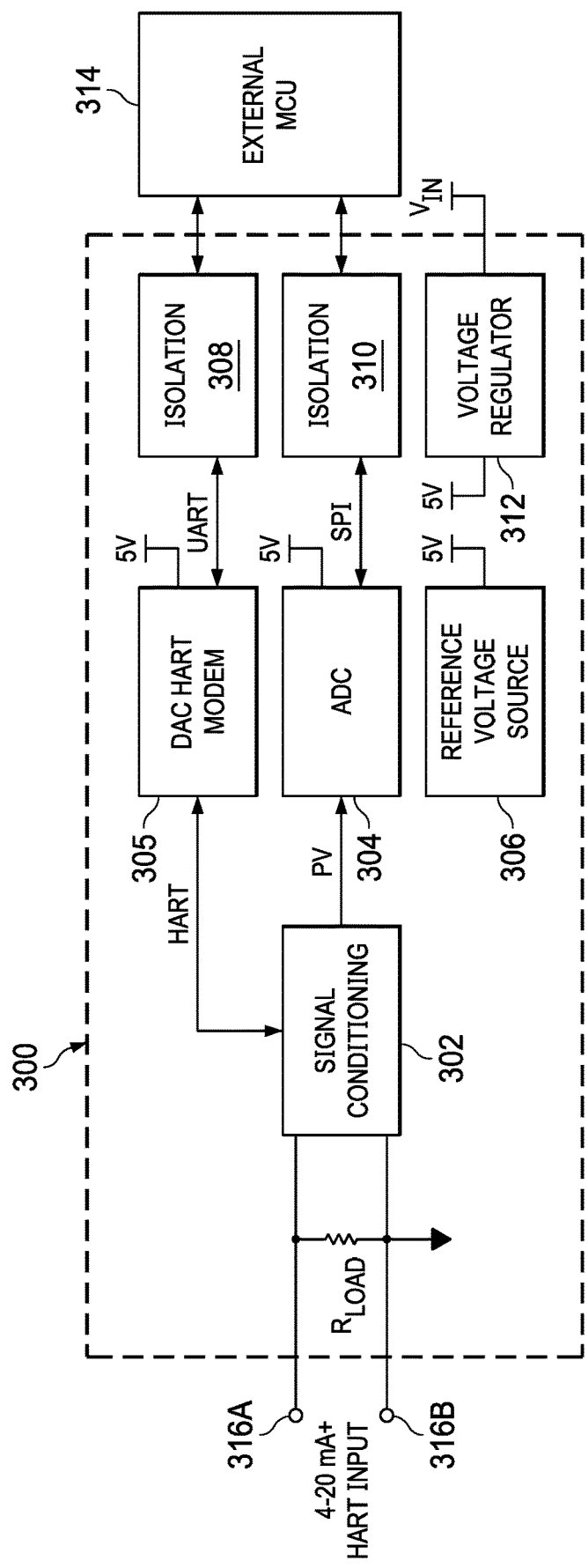
FIG. 3 is a block diagram showing a HART-enabled current input module in accordance with an example embodiment.

FIG. 3 is a block diagram showing a HART-enabled current input module 300 in accordance with an example embodiment. In the example of FIG. 3, the HART-enabled current input module 300 is part of a transmitter assembly (e.g., the transmitter assembly 102 in FIG. 1) of a current loop (e.g., the current loop 100 in FIG. 1). As shown, the HART-enabled current input module 300 includes a DAC HART modem 305 configured to communicate with an external MCU 314 via UART communications lines and an isolation block 308 (e.g., an isolator for each UART communication line). The HART-enabled current input module 300 also includes a ADC 304 configured to communicate with the external MCU 314 via SPI communications lines and an isolation block 310 (e.g., an isolator for each SPI communication line). The HART-enabled current input module 300 also includes a load (RLOAD) and a signal conditioning block 302 coupled to current loop terminals 316A and 316B, where the output of the signal conditioning block 302 is provided to the DAC HART modem 305 and the ADC 304. In the example of the FIG. 3, the operations of the ADC 304 are a function of a reference voltage received from a reference voltage source 306, where the reference voltage source 306 receives an input voltage from a voltage regulator 312. In some example embodiments, a HART-enabled device, applied to the HART-enabled current input module 300, includes the ADC 304 and the HART-enabled device 1106, where the break extension protocol and a compact two-wire integrated interface is used for communications between the ADC 304 and the HART-enabled device 1106.

In some example embodiments, a HART-enabled current input module such as the HART-enabled current input module 300 of FIG. 3 includes a HART-enabled device (e.g., the HART-enabled device 110) that combines components of the HART-enabled current input module 300. In some example embodiments, a HART-enabled device for the HART-enabled current input module 300 includes the ADC 304 and the DAC HART modem 305. In other example embodiments, the HART-enabled device for the HART-enabled current input module 300 includes all components of the HART-enabled current input module 300. Regardless of the particular combination of components, a HART-enabled device for the HART-enabled current input module 300 uses a break extension protocol and a reduced set of communication lines as described herein.

In one example embodiment, a HART-enabled device for the HART-enabled current input module 300 reduces the number of communication lines used (e.g., the SPI communication lines between the ADC 304 and the external MCU 314 are no longer needed, and the UART communication lines between the DAC HART modem 305 and the external MCU 314 are reduced). Also, a HART-enabled device for the HART-enabled current input module 300 reduces the number of isolators (e.g., 2 instead of 10) such that the isolation block 310 is eliminated and the isolation block 308 is simplified. With a HART-enabled device for the HART-enabled smart transmitter module 300, the DAC HART modem 305 is able to communicate with: the external MCU 314 using the break extension protocol and the reduced set of communication lines (e.g., UART TXD and RXD communication lines); the ADC 304 using the break extension protocol and the reduced set of communication lines (e.g., UART TXD and RXD communication lines); and/or any other component normally controlled through SPI/I2C or other protocols.

In some example embodiments, a HART-enabled device for the HART-enabled current input module 300 is able to perform SPI and UART communications using only two communication lines (e.g., UART TXD and RXD communication lines) and the break extension protocol. In different examples, different SPI signaling options (e.g., /CS, SDI, SDO, SCLK) and UART signaling options (e.g., TXD, RXD, RTS, CTS, CD, MCU, IRQ) are performed using only the UART TXD and RXD communication lines and the break extension protocol. In other example embodiments, a HART-enabled device for the HART-enabled current input module 300 uses a reduced set of communication lines to support UART and SPI communications (e.g., the UART TXD and RXD communication lines and at least one additional communication line related to /CS, SDI, SDO, SCLK, RTS, CTS, CD, MCU, and/or IRQ signaling). By using the break extension protocol with the HART-enabled device for the HART-enabled current input module 300 and a reduced set of communication lines to support UART and SPI communications, the complexity of the HART-enabled current input module 300 is simplified, which reduces an IC footprint and related cost compared to legacy HART-enabled current input modules. Again, fewer isolators are needed (e.g., 2 instead of 10), which reduces cost and complexity.

Figure 4:
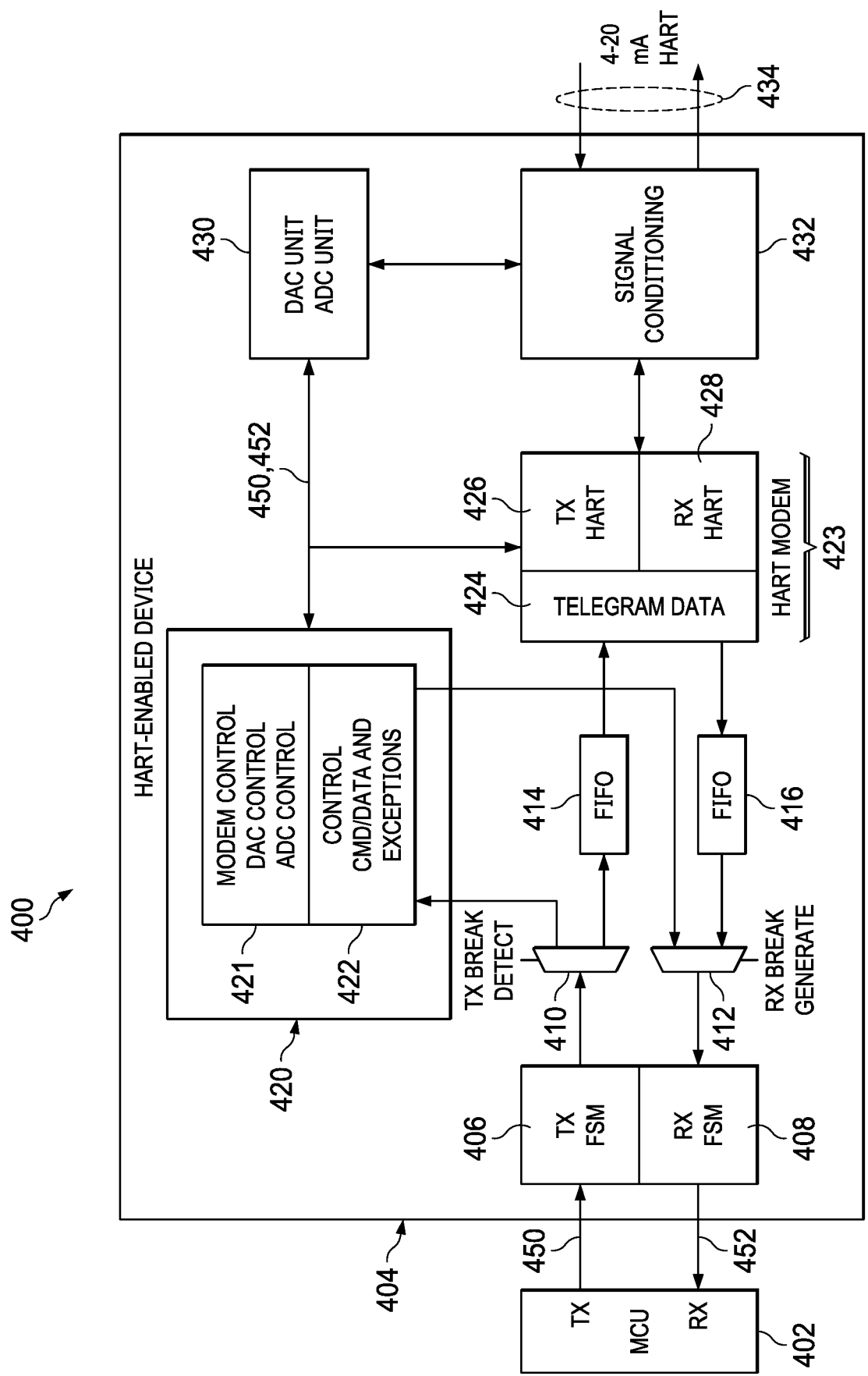
FIG. 4 is a block diagram showing a current loop transmitter assembly in accordance with an example embodiment.

FIG. 4 is a block diagram showing a current loop transmitter assembly 400 (e.g., at least part of the transmitter assembly 102 in FIG. 1) in accordance with an example embodiment. As shown, the current loop transmitter assembly 400 includes an MCU 402 coupled to a HART-enabled device 404. In the example of FIG. 4, the HART-enabled device 404 is an example of the HART-enabled device 110 in FIG. 1, the HART-enabled device 110A in FIG. 2, or the HART-enabled device 110B in FIG. 3. As shown, the HART-enabled device 404 comprises a transmitter finite state machine (FSM) 406 and a receiver FSM 408 coupled to a respective transmit (TX) output and receive (RX) input of an MCU 402. More specifically, in some example embodiments, the transmitter FSM 406 is coupled to the TX output of the MCU 402 via a UART TXD communication line 450, where the transmitter FSM 406 is configured to handle transmit data from the MCU 402. Also, the receiver FSM 408 is coupled to the RX input of the MCU 402 via a UART RXD communication line 452 where the receiver FSM 408 is configured to handle receive data to the MCU 402.

In the example of FIG. 4, the HART-enabled device 404 enables the MCU 402 to transmit data to a current loop 434 via the transmitter FSM 406, a demultiplexer 410 controlled by a transmit break control signal ("Tx Break Detect") that indicates occurrence of a break condition, a first-in first-out (FIFO) buffer 414, a HART modem 423, and signal conditioning components 432. In the example of FIG. 4, the HART modem 423 prepares the data being transmitted as telegram data 424 according to the HART protocol and uses transmit HART components 426 to transmit the telegram data 424 to the signal conditioning components 432. The HART-enabled device 404 also enables the MCU 402 to receive data from the current loop 434 via the signal conditioning components 432, the HART modem 423, a FIFO buffer 416, a multiplexer 412 controlled by a receive break control signal ("Rx Break Generate"), and the RX FSM 408. In the example of FIG. 4, the HART modem 423 uses receive HART components 428 to demodulate the data being received as telegram data 424 according to the HART protocol.

In the example of FIG. 4, Tx Break Detect is asserted when there is a break condition in transmitting data from the MCU 402 to the current loop 434 for at least a predetermined interval. In some example embodiments, the break condition is detected when the UART TXD communication line is at a logic low level for longer than a predetermined interval (e.g., 11-bits in a UART telegram). Also, in some example embodiments, the break condition on the UART TXD communication line 450 (e.g., when the MCU 402 sends data to the HART-enabled device 404) indicates a control write command or control write data for a component included with the HART-enabled device 404. In such case, the HART-enabled device 404 uses a break extension protocol controller 420 (an example of the break extension protocol controller 114 in FIG. 1) to perform any of a first set of control operations 421 such as modem control, DAC control, and/or ADC control operations. The break extension protocol controller 420 is additionally or alternatively configured to perform any of a second set of control operations 422 such as control command/data and/or exception operations. As needed, the control operations of the break extension protocol controller 420 involve SPI or UART communications with the MCU 402 and/or a block 430, which corresponds to an ADC and/or DAC. As shown, the block 430 is coupled to the break extension protocol controller 420, the HART modem 423 and the signal conditioning components 432. In different example embodiments, the break extension protocol controller 420 is coupled to or within a HART modem (e.g., the HART modem 423). Also, in different examples embodiments, the break extension protocol controller 420 is a combination of hardware (e.g., a processor, application-specific integrated circuit or ASIC, a programmable logic), software (instructions for execution by hardware), and/or gates.

In the example of FIG. 4, Rx Break Generate is asserted when there is a break in receiving data from the current loop 434 for at least a predetermined interval. In one example embodiment, the break condition is detected when the UART RXD communication line 452 is at a logic low level for longer than a predetermined interval (e.g., 11-bits in a UART telegram). Also, the break condition on the UART RXD communication line (when the MCU 402 sends data to the HART-enabled device 404) indicates control read data, a status exception, or the acknowledgement of a break write command for a component included with the HART-enabled device 404. In such case, the HART-enabled device 404 uses the break extension protocol controller 420 to perform any of the first set of control operations 421 or to perform any of the second set of control operations 422. As needed, the control operations of the break extension protocol controller 420 involve SPI or UART communications with the MCU 402 and/or the block 430. In different examples, the break extension protocol and the reduced set of communication lines (e.g., the UART TXD communication line 450 and the UART RDX communication line 452) are used for communications between: the HART modem 423 and the MCU 402, the HART modem 423 and a DAC of block 430, the HART modem 423 and an ADC of block 430, and/or the HART modem 423 and any other component normally controlled through SPI/I2C or other protocols.

Figure 5:
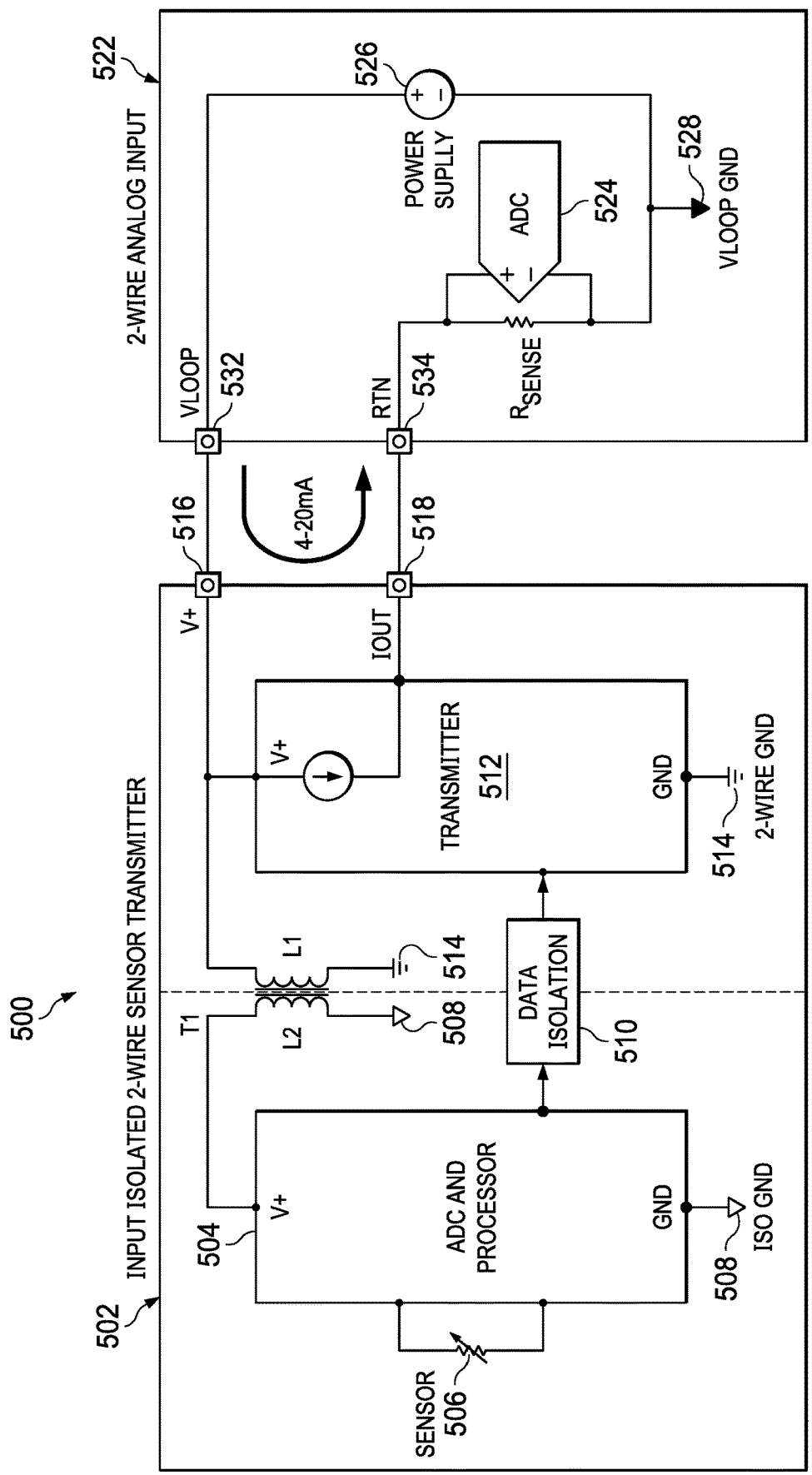
FIG. 5 is a diagram showing a 2-wire current loop in accordance with an example embodiment.

FIG. 5 is a diagram showing a 2-wire current loop 500 in accordance with an example embodiment. In the example of FIG. 5, the 2-wire current loop 500 includes an input isolated 2-wire sensor transmitter module 502 with current loop terminals 516 and 518. As shown, the input isolated 2-wire sensor transmitter module 502 also includes a transmitter 512 with a voltage supply terminal coupled to the current loop terminal 516 and with an output current (IOUT) output coupled to the current loop terminal 518. The transmitter 512 is also coupled to a 2-wire ground 514. The voltage at the current loop terminal 516 is also provided to a transformer (T1) with a primary coil (L1) and a secondary coil (L2), where a first end of L1 is coupled to the current loop terminal 516 and a second end of L1 is the 2-wire ground 514, and where a first end of L2 is coupled to an ADC and processor block 504 and an isolation ground 508. As shown, the ADC and processor block 504 is also coupled to the isolation ground 508 and a sensor 506. Between the ADC and processor block 504 and the transmitter 512 is a data isolation block 510 that enables communications (e.g., sensor data or resulting signals) from the ADC and processor block 504 to the transmitter 512.

In the example of FIG. 5, the 2-wire current loop 500 also includes a 2-wire analog input module 522 coupled to the input isolated 2-wire sensor transmitter module 502. As shown, the 2-wire analog input module 522 includes current loop terminals 532 and 534, where the current loop terminal 534 is coupled to a sense resistor ($R_{SENSE}$). In the example of FIG. 5, the voltage across $R_{SENSE}$ is digitized by an ADC 524. The 2-wire analog input module 522 also includes a power supply 526 for the current loop 500, where the power supply 526 is coupled between a current loop ground 528 and the current loop terminal 532.

In operation, the power supply 526 is configured to supply sufficient voltage for current (4-20 mA) to flow in the current loop 500 from the 2-wire analog input module 522 to the input isolated 2-wire sensor transmitter 502 (via the current loop terminals 532 and 516) and back to the current loop ground 528 (via the current loop terminals 518 and 534). As needed, the input isolated 2-wire sensor transmitter module 502 conveys sensor data or related signaling to the 2-wire analog input module 522, where the transmitter 512 includes a HART-enabled device (e.g., the HART-enabled device 110 in FIG. 1, the HART-enabled device 110A in FIG. 2, the HART-enabled device 110b in FIG. 3, or the HART-enabled device 404 in FIG. 4) that supports UART and SPI communications using a break extension protocol and a reduced number of UART communication lines as described herein.

Figure 6:
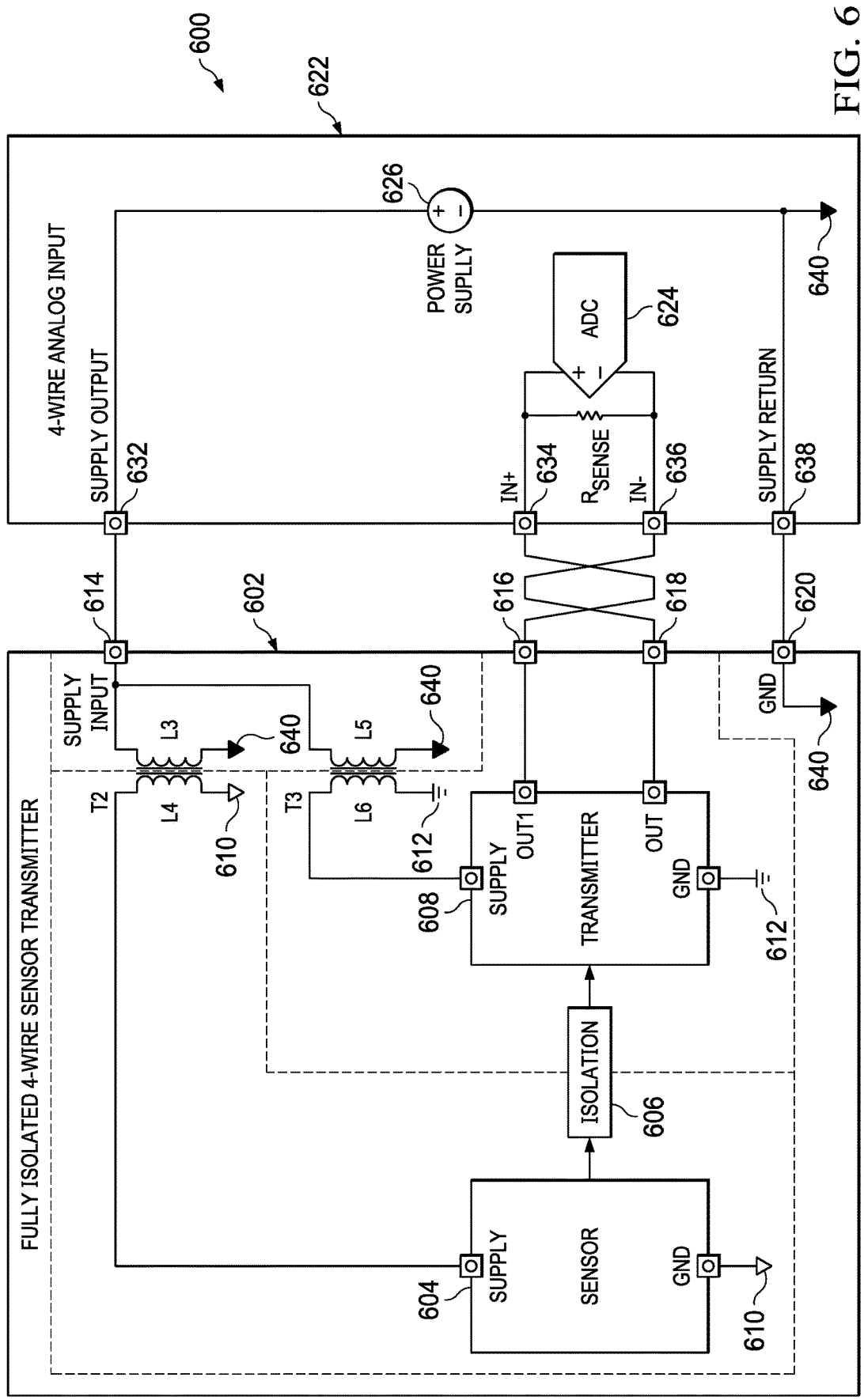
FIG. 6 is a diagram showing a 4-wire current loop in accordance with an example embodiment.

FIG. 6 is a diagram showing a 4-wire current loop 600 in accordance with an example embodiment. In the example of FIG. 6, the 4-wire current loop 600 includes an fully isolated 4-wire sensor transmitter module 602 with current loop terminals 614, 616, 618, and 620. As shown, the fully isolated 4-wire sensor transmitter module 602 also includes a sensor 604 with a voltage supply (SUPPLY) output coupled to the current loop terminal 614 via a transformer (T2) having a primary coil (L3) and a second coil (L4). The fully isolated 4-wire sensor transmitter module 602 also includes a transmitter 608 with a voltage supply (SUPPLY) output coupled to the current loop terminal 614 via a transformer (T3) with a primary coil (L5) and a secondary coil (L6). In other words, T2 provides the voltage supply for the sensor 604, while T3 provides the voltage supply for the transmitter 608.

In the example of FIG. 6, various grounds are represented including a current loop ground 640, a 4-wire ground 612, and an isolation ground 610. As shown, a first end of L3 is coupled to the current loop terminal 614 and a second end of L3 is coupled to the current loop ground 640. Also, a first end of L4 is coupled to the sensor 604 and a second end of L4 is coupled to the isolation ground 610. Also, a first end of L5 is coupled to the current loop terminal 614 and a second end of L5 is coupled the current loop ground 640. Also, a first end of L6 is coupled to the transmitter 608 and a second end of L6 is coupled to the 4-wire ground 612. Between the sensor 604 and the transmitter 608 is a data isolation block 606 that enables communications (e.g., sensor data or resulting signals) from the sensor 604 to the transmitter 608.

In the example of FIG. 6, the 4-wire current loop 600 also includes a 4-wire analog input module 622 coupled to the fully isolated 4-wire sensor transmitter module 602. As shown, the 4-wire analog input module 622 includes current loop terminals 632, 634, 636, and 638, where the current loop terminals 634 and 636 are coupled across a sense resistor ($R_{SENSE}$). In the example of FIG. 6, the voltage across $R_{SENSE}$ is digitized by an ADC 624. The 4-wire analog input module 622 also includes a power supply 626 for the current loop 600, where the power supply 626 is coupled between a current loop ground 640 and the current loop terminal 632. With the arrangement of FIG. 6, the terminal 638 of the 4-wire analog input module 622 is coupled to the current loop ground 640 and to the terminal 620 of the fully isolated 4-wire sensor transmitter module 602 to extend the current loop ground to the fully isolated 4-wire sensor transmitter module 602.

In operation, the power supply 626 is configured to supply sufficient voltage for current (4-20 mA) to flow in the current loop 600 from the 4-wire analog input module 622 to the fully isolated 4-wire sensor transmitter 602 (via the current loop terminals 632 and 614) and back to the current loop ground 640 (via the current loop terminals 638 and 620, where L3 and L5 are coupled to the current loop ground 640. Also, the transmitter 608 outputs a differential signal conveyed from the fully isolated 4-wire sensor transmitter 602 to the 4-wire analog input module 622 via the current loop terminals 616, 618 of the fully isolated 4-wire sensor transmitter 602 and the current loop terminals 634, 636 of the 4-wire analog input module 622. As needed, the fully isolated 4-wire sensor transmitter module 602 conveys sensor data or related signaling to the 4-wire analog input module 622, where the transmitter 608 includes a HART-enabled device (e.g., the HART-enabled device 108 in FIG. 1, the HART-enabled device 108A in FIG. 2, the HART-enabled device 108B in FIG. 3, or the HART-enabled device 404 in FIG. 4) that supports UART and SPI communications using a reduced number of UART communication lines and a break extension protocol as described herein.

In some example embodiments, a break command format includes 4 bytes (Byte1-Byte4), where Byte1 indicated a break condition, Byte2 includes a command identifier (ID), and Byte3 and Byte 4 correspond to command data. Also, some example embodiments, a break command response format includes 4 bytes (Byte1-Byte4), where Byte1 indicates a break condition, Byte2 includes a command response ID, and Byte3 and Byte 4 correspond to command response data. Also, in some example embodiments, a break exception format includes 4 bytes (Byte1-Byte4), where Byte1 indicates a break condition, Byte2 includes an exception ID, and Byte3 and Byte4 correspond to exception data In some example embodiments, a current loop (e.g., the current loop 100 in FIG. 1; the current loop 500 in FIG. 5, or the current loop 600 in FIG. 6) includes: a receiver assembly (e.g., the receiver assembly 122 in FIG. 1, the receiver module 522 in FIG. 5, or the receiver module 622 in FIG. 6); a transmitter assembly (e.g., the transmitter assembly 102 in FIG. 1, the transmitter module 502 in FIG. 5, or the transmitter module 602 in FIG. 6); a first conductor (132) between the receiver assembly and the transmitter assembly; and a second conductor (134) between the receiver assembly and the transmitter assembly to complete the current loop. The transmitter assembly includes: a HART modem (e.g., the DAC HART modem 208 in FIG. 2, the DAC HART modem 305 in FIG. 3, or the HART modem 423 in FIG. 4); a component (e.g., the MCU 108 in FIG. 1, the MCU 204 in FIG. 2, the external MCU 314 in FIG. 3, the MCU 402 in FIG. 4, the DAC 206 in FIG. 2, the ADC 304 in FIG. 3, or the block 430 in FIG. 4) in communication with the HART modem via a partial set of UART communication lines (e.g., the UART TXD and RXD communication lines 450 and 452 in FIG. 4). In some example embodiments, the component comprises an MCU (e.g., the MCU 108 in FIG. 1, the MCU 204 in FIG. 2, the external MCU 314 in FIG. 3, or the MCU 402 in FIG. 4). In some example embodiments, the component comprises an ADC (e.g., the ADC 304 in FIG. 3; or block 430 in FIG. 4) or a DAC (e.g., the DAC 206 in FIG. 2, or block 430 in FIG. 4). The transmitter assembly also includes: a break extension protocol controller (e.g., the break extension protocol controller 114 in FIG. 1, or the break extension protocol controller 420 in FIG. 4) coupled to or included with the HART modem and configured to support UART and non-UART communications between the HART modem and the component using the partial set of UART communication lines.

In some example embodiments, the HART modem and the break extension protocol controller are components of a HART-enabled smart transmitter module (e.g., the HART-enabled smart transmitter module 200 in FIG. 2). In some example embodiments, the HART modem and the break extension protocol controller are components of a HART-enabled current input module (e.g., the HART-enabled current input module 300 in FIG. 3). In some example embodiments, the break extension protocol controller is configured to detect a break condition on the partial set of UART communication lines to support UART and non-UART communications between the HART modem and the component. In some example embodiments, the break extension protocol controller is configured to detect the break condition when any one of the partial set of UART communication lines is at a logic low level for longer than a predetermined interval, wherein the predetermined interval corresponds to 11-bits in a UART telegram (e.g., telegram data 424 in FIG. 4). In some example embodiments, the break extension protocol controller is configured to detect the break condition when data sent from the component via one of the partial set of UART communication lines indicates a control write command or control write data. In some example embodiments, the break extension protocol controller is configured to detect the break condition when data sent from the HART modem via one of the partial set of UART communication lines indicates a control read data, status exception, or acknowledgement of a break write command.

In some example embodiments, a HART-enabled device (e.g., the HART-enabled device 110 in FIG. 1, or the HART-enabled device 404 in FIG. 4) includes: a UART TXD communication line (e.g., the UART TXD communication line 450 in FIG. 4); a UART RXD communication line (e.g., the UART RXD communication line 452 in FIG. 4); and a HART modem (e.g., the DAC HART modem 208 in FIG. 2, the DAC HART modem 305 in FIG. 3, the HART modem 423 in FIG. 4) coupled to UART TXD and RXD communication lines, wherein the HART modem is configured to support UART and non-UART communications using the UART TXD and RXD communication lines. In some example embodiments, the HART-enabled device includes a DAC (e.g., the DAC 206 in FIG. 2, or block 430 in FIG. 4) coupled to the HART modem via the UART TXD and RXD communication lines. In some example embodiments, the HART-enabled device includes an ADC (e.g., the ADC 304 in FIG. 3, or 430 in FIG. 4) coupled to the HART modem via the UART TXD and RXD communication lines.

In some example embodiments, a current loop transmitter module (e.g., transmitter assembly 102 in FIG. 1, the transmitter module 502 in FIG. 5, or the transmitter module 602 in FIG. 6) includes: an MCU (e.g., MCU 108 in FIG. 1, MCU 204 in FIG. 2, external MCU 314 in FIG. 3, or the MCU 402 in FIG. 4); a converter (e.g., the DAC 206 in FIG. 2, the ADC 305 in FIG. 3, or block 430 in FIG. 4) configured to convert analog signals to digital signals or to convert digital signals to analog signals; a HART modem (e.g., the DAC HART modem 208 in FIG. 2, the DAC HART modem 305 in FIG. 3, or the HART modem 423 in FIG. 4) coupled to the MCU and the converter via TXD and RXD communication lines (e.g., the UART TXD and RXD communication lines 450 and 452 in FIG. 4); and a break extension protocol controller (e.g., the break extension protocol controller 114 in FIG. 1, or the break extension protocol controller 420 in FIG. 4) coupled to or included with the HART modem and configured to support UART and non-UART communications between the HART modem and the MCU and between the HART modem (423) and the converter (DAC 206, FIG. 2; ADC 305, FIG. 3; block 430, FIG. 4) using the UART TXD and RXD communication lines (450, 452, FIG. 4).

In some example embodiments, the break extension protocol controller is configured to support the UART and non-UART communications between the HART modem and the MCU or between the HART modem and the converter responsive to a break condition on the UART TXD communication line detected when data on the UART TXD communication line indicates a control write command or control write data. In some example embodiments, the break extension protocol controller is configured to support the UART and non-UART communications between the HART modem and the MCU or between the HART modem and the converter responsive to a break condition on the UART RXD communication line detected when data on the UART RXD communication line indicates a control read data, a status exception, or an acknowledgement of a break write command. In some example embodiments, the break extension protocol controller is configured to support the UART and non-UART communications between the HART modem and the MCU or between the HART modem and the converter responsive to a break condition on the UART TXD or RXD communication line detected when the UART TXD or UART RXD communication line is at a logic low level for longer than a predetermined interval, wherein the predetermined interval corresponds to 11-bits in a UART telegram.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims. For example, modem functionality is not limited to UART interfaces as described herein. In some example embodiments, a modem has an SPI interface. In these examples, a HART-enabled device with the modem could use the break extension protocol and a reduced set of SPI communication lines to achieve similar benefits as described herein.

What is claimed is:

1. A current loop, comprising:
   a receiver assembly;
   a transmitter assembly;
   a first wire coupled to the receiver assembly and the transmitter assembly; and
   a second wire coupled to the receiver assembly and the transmitter assembly to complete the current loop, wherein the transmitter assembly includes:
      a Highway Addressable Remote Transducer (HART) modem;
      a component in communication with the HART modem via a partial set of Universal Asynchronous Receiver-Transmitter (UART) communication lines; and
      a break extension protocol controller coupled to or included with the HART modem and configured to support UART and non-UART communications between the HART modem and the component using the partial set of UART communication lines;
   wherein the break extension protocol controller is configured to detect a break condition on the partial set of UART communication lines to support UART and non-UART communications between the HART modem and the component; and
   wherein the break extension protocol controller is configured to detect the break condition when any one of the partial set of UART communication lines is at a logic low level for longer than a predetermined interval, wherein the predetermined interval corresponds to 11-bits in a UART telegram.

2. The current loop of claim 1, wherein the partial set of UART communication lines consist of UART TXD and RXD communication lines.

3. The current loop of claim 1, wherein the HART modem and the break extension protocol controller are components of a HART-enabled smart transmitter module.

4. The current loop of claim 1, wherein the HART modem and the break extension protocol controller are components of a HART-enabled current input module.

5. The current loop of claim 1, wherein the component comprises a microcontroller (MCU).

6. The current loop of claim 1, wherein the component comprises an analog-to-digital converter (ADC) or a digital-to-analog converter (DAC).

7. A Highway Addressable Remote Transducer (HART)-enabled device, comprising:
   a Universal Asynchronous Receiver-Transmitter (UART) TXD communication line;
   a UART RXD communication line; a Highway Addressable Remote Transducer (HART) modem coupled to UART TXD and RXD communication lines, wherein the HART modem is configured to support UART and non-UART communications using the UART TXD and RXD communication lines; and
   a digital-to-analog converter (DAC) coupled to the HART modem via the UART TXD and RXD communication lines;
   wherein the HART modem is configured to support UART and non-UART communications based on a break extension protocol and the UART TXD and RXD communication lines; and
   wherein a break condition of the break extension protocol is detected when the UART TXD or UART RXD communication line is at a logic low level for longer than a predetermined interval, wherein the predetermined interval corresponds to 11-bits in a UART telegram.

8. The HART-enabled device of claim 7, wherein a break condition of the break extension protocol is detected when data sent from a component to the HART modem via the UART TXD communication line indicates a control write command or control write data.

9. The HART-enabled device of claim 7, wherein a break condition of the break extension protocol is detected when data sent from the HART modem to a component via the UART RXD communication line indicates a control read data, status exception, or acknowledgement of a break write command.

10. A current loop transmitter module, comprising:
    a microcontroller (MCU);
    a converter configured to convert analog signals to digital signals or to convert digital signals to analog signals;
    a Highway Addressable Remote Transducer (HART) modem coupled to the MCU and the converter via Universal Asynchronous Receiver-Transmitter (UART) TXD and RXD communication lines; and
    a break extension protocol controller coupled to or included with the HART modem and configured to support Universal Asynchronous Receiver-Transmitter (UART) and non-UART communications between the HART modem and the MCU and between the HART modem and the converter using the UART TXD and RXD communication lines;
    wherein the break extension protocol controller is configured to support the UART and non-UART communications between the HART modem and the MCU or between the HART modem and the converter responsive to a break condition on the UART TXD communication line detected when data on the UART TXD communication line indicates a control write command or control write data.

11. A current loop transmitter module, comprising:
    a microcontroller (MCU);
    a converter configured to convert analog signals to digital signals or to convert digital signals to analog signals;
    a Highway Addressable Remote Transducer (HART) modem coupled to the MCU and the converter via Universal Asynchronous Receiver-Transmitter (UART) TXD and RXD communication lines; and
    a break extension protocol controller coupled to or included with the HART modem and configured to support Universal Asynchronous Receiver-Transmitter (UART) and non-UART communications between the HART modem and the MCU and between the HART modem and the converter using the UART TXD and RXD communication lines;
    wherein the break extension protocol controller is configured to support the UART and non-UART communications between the HART modem and the MCU or between the HART modem and the converter responsive to a break condition on the UART RXD communication line detected when data on the UART RXD communication line indicates a control read data, a status exception, or an acknowledgement of a break write command.

12. A current loop transmitter module, comprising:
a microcontroller (MCU);
a converter configured to convert analog signals to digital signals or to convert digital signals to analog signals;
a Highway Addressable Remote Transducer (HART) modem coupled to the MCU and the converter via Universal Asynchronous Receiver-Transmitter (UART) TXD and RXD communication lines; and
a break extension protocol controller coupled to or included with the HART modem and configured to support Universal Asynchronous Receiver-Transmitter (UART) and non-UART communications between the HART modem and the MCU and between the HART modem and the converter using the UART TXD and RXD communication lines;
wherein the break extension protocol controller is configured to support the UART and non-UART communications between the HART modem and the MCU or between the HART modem and the converter responsive to a break condition on the UART TXD or RXD communication line detected when the UART TXD or UART RXD communication line is at a logic low level for longer than a predetermined interval, wherein the predetermined interval corresponds to 11-bits in a UART telegram.

13. A current loop, comprising:
a receiver assembly;
a transmitter assembly;
a first wire coupled to the receiver assembly and the transmitter assembly; and
a second wire coupled to the receiver assembly and the transmitter assembly to complete the current loop, wherein the transmitter assembly includes:
a Highway Addressable Remote Transducer (HART) modem;
a component in communication with the HART modem via a partial set of Universal Asynchronous Receiver-Transmitter (UART) communication lines; and
a break extension protocol controller coupled to or included with the HART modem and configured to support UART and non-UART communications between the HART modem and the component using the partial set of UART communication lines;
wherein the break extension protocol controller is configured to detect a break condition on the partial set of UART communication lines to support UART and non-UART communications between the HART modem and the component; and
wherein the break extension protocol controller is configured to detect the break condition when data sent from the component via one of the partial set of UART communication lines indicates a control write command or control write data.

14. The current loop of claim 13, wherein the partial set of UART communication lines consist of UART TXD and RXD communication lines.

15. The current loop of claim 13, wherein the HART modem and the break extension protocol controller are components of a HART-enabled smart transmitter module.

16. The current loop of claim 13, wherein the HART modem and the break extension protocol controller are components of a HART-enabled current input module.

17. The current loop of claim 13, wherein the component comprises a microcontroller (MCU).

18. The current loop of claim 13, wherein the component comprises an analog-to-digital converter (ADC) or a digital-to-analog converter (DAC).

19. A current loop, comprising:
a receiver assembly;
a transmitter assembly;
a first wire coupled to the receiver assembly and the transmitter assembly; and
a second wire coupled to the receiver assembly and the transmitter assembly to complete the current loop, wherein the transmitter assembly includes:
a Highway Addressable Remote Transducer (HART) modem;
a component in communication with the HART modem via a partial set of Universal Asynchronous Receiver-Transmitter (UART) communication lines; and
a break extension protocol controller coupled to or included with the HART modem and configured to support UART and non-UART communications between the HART modem and the component using the partial set of UART communication lines;
wherein the break extension protocol controller is configured to detect a break condition on the partial set of UART communication lines to support UART and non-UART communications between the HART modem and the component; and
wherein the break extension protocol controller is configured to detect the break condition when data sent from the HART modem via one of the partial set of UART communication lines indicates a control read data, status exception, or acknowledgement of a break write command.

20. The current loop of claim 19, wherein the partial set of UART communication lines consist of UART TXD and RXD communication lines.

21. The current loop of claim 19, wherein the HART modem and the break extension protocol controller are components of a HART-enabled smart transmitter module.

22. The current loop of claim 19, wherein the HART modem and the break extension protocol controller are components of a HART-enabled current input module.

23. The current loop of claim 19, wherein the component comprises a microcontroller (MCU).

24. The current loop of claim 19, wherein the component comprises an analog-to-digital converter (ADC) or a digital-to-analog converter (DAC).

25. A Highway Addressable Remote Transducer (HART)-enabled device, comprising:
a Universal Asynchronous Receiver-Transmitter (UART) TXD communication line;
a UART RXD communication line; a Highway Addressable Remote Transducer (HART) modem coupled to UART TXD and RXD communication lines, wherein the HART modem is configured to support UART and non-UART communications using the UART TXD and RXD communication lines; and
a digital-to-analog converter (DAC) coupled to the HART modem via the UART TXD and RXD communication lines;
wherein a break condition of the break extension protocol is detected when data sent from a component to the HART modem via the UART TXD communication line indicates a control write command or control write data.

26. A Highway Addressable Remote Transducer (HART)-enabled device, comprising:
- a Universal Asynchronous Receiver-Transmitter (UART) TXD communication line;
- a UART RXD communication line; a Highway Addressable Remote Transducer (HART) modem coupled to UART TXD and RXD communication lines, wherein the HART modem is configured to support UART and non-UART communications using the UART TXD and RXD communication lines; and
- a digital-to-analog converter (DAC) coupled to the HART modem via the UART TXD and RXD communication lines;
- wherein a break condition of the break extension protocol is detected when data sent from the HART modem to a component via the UART RXD communication line indicates a control read data, status exception, or acknowledgement of a break write command.

* * * * *